US006794086B2

(12) United States Patent
Dai et al.

(10) Patent No.: US 6,794,086 B2
(45) Date of Patent: Sep. 21, 2004

(54) THERMALLY PROTECTIVE SALT MATERIAL FOR THERMAL SPRAYING OF ELECTRODE MATERIALS

(75) Inventors: Jinxiang Dai, Willington, CT (US); Ronald A. Guidotti, Albuquerque, NM (US); Tongsan D. Xiao, Willington, CT (US); David E. Reisner, Bristol, CT (US)

(73) Assignees: Sandia Corporation, Albuquerque, NM (US); U.S. Nanocorp, Inc., Farmington, CT (US)

( * ) Notice: Subject to any disclaimer, the term of this patent is extended or adjusted under 35 U.S.C. 154(b) by 0 days.

(21) Appl. No.: 09/795,696

(22) Filed: Feb. 28, 2001

(65) Prior Publication Data

US 2002/0018929 A1 Feb. 14, 2002

Related U.S. Application Data

(60) Provisional application No. 60/185,263, filed on Feb. 28, 2000.

(51) Int. Cl.$^7$ ................................................ H01M 4/58
(52) U.S. Cl. ............... 429/231.95; 429/209; 429/218.6; 429/231.9
(58) Field of Search .............................. 429/209, 218.6, 429/231.9, 231.95

(56) References Cited

U.S. PATENT DOCUMENTS

| | | | |
|---|---|---|---|
| 3,332,753 A | 7/1967 | Batchelor et al. | 29/191.6 |
| 3,694,266 A | 9/1972 | Bergum et al. | 136/111 |
| 3,770,505 A | 11/1973 | Bergum et al. | 136/10 |
| 3,802,893 A | 4/1974 | Kiger et al. | 106/62 |
| 3,890,686 A | 6/1975 | Caubet et al. | |
| 3,907,589 A | 9/1975 | Gay et al. | 136/6 R |
| 4,013,818 A | 3/1977 | Askew et al. | 429/112 |
| 4,119,759 A | 10/1978 | Fischer et al. | |
| 4,119,769 A | 10/1978 | Schneider et al. | |
| 4,141,743 A | 2/1979 | Grubba et al. | 106/66 |

(List continued on next page.)

FOREIGN PATENT DOCUMENTS

| | | |
|---|---|---|
| WO | WO 97/18341 | 5/1997 |
| WO | WO 99/64641 | 12/1999 |

OTHER PUBLICATIONS

Reisner, D.E., et al. "Thermal–Sprayed Thin Film Cathodes for Thermal Battery," Journal of New Materials for Electochemical Systems, 2, 279–283 (1999).*

Metals Handbook, Ninth Edition: vol. 5 Suface Cleaning, Finishing and Coating. American Society for Metals. 1982. pp. 364–365.

(List continued on next page.)

*Primary Examiner*—Dah-Wei Yuan
(74) *Attorney, Agent, or Firm*—Cantor Colburn LLP

(57) ABSTRACT

A method for the manufacture of an electrode for an energy storage or conversion device comprises thermally spraying a feedstock mixture comprising an effective quantity of a source of a thermally protective salt and an active material or active material precursor onto a substrate to produce a film of the active material and salt. The film can have a thickness of about 1 to about 1000 microns.

In a particularly advantageous feature, the active materials which ordinarily decompose or are unavailable at the high temperatures used during thermal spray processes, such as metal chalcogenides such as pyrite, $CoS_2$, $WS_2$, $Ni(OH)_2$, $MnO_2$, and the like may be thermally sprayed to form an electrode when the feedstock mixture employs an effective amount of a source of the thermally protective salt coating. The active material feedstock may comprise microstructured or nanostructured materials, which after thermal spray results in electrodes having microstructured or nanostructured active materials, respectively.

37 Claims, 6 Drawing Sheets

U.S. PATENT DOCUMENTS

| | | | |
|---|---|---|---|
| 4,675,257 A | | 6/1987 | Winchester |
| 4,731,307 A | | 3/1988 | Guidotti |
| 4,840,859 A | | 6/1989 | Williams et al. |
| 4,869,936 A | | 9/1989 | Moskowitz et al. ......... 427/423 |
| 4,881,951 A | | 11/1989 | Wood et al. .................. 51/309 |
| 5,059,095 A | | 10/1991 | Kushner et al. ............ 416/241 |
| 5,080,056 A | | 1/1992 | Kramer et al. ............... 123/193 |
| 5,158,843 A | | 10/1992 | Batson et al. ................ 429/218 |
| 5,198,308 A | | 3/1993 | Shetty et al. ................ 428/608 |
| 5,254,415 A | * | 10/1993 | Williams et al. ............. 429/153 |
| 5,271,967 A | | 12/1993 | Kramer et al. ............. 427/455 |
| 5,312,653 A | | 5/1994 | Buchanan ................... 427/451 |
| 5,328,763 A | | 7/1994 | Terry .......................... 428/559 |
| 5,332,422 A | | 7/1994 | Rao ............................. 75/252 |
| 5,426,003 A | | 6/1995 | Spengler et al. .............. 429/27 |
| 5,484,662 A | | 1/1996 | Rao ............................ 428/553 |
| 5,498,269 A | | 3/1996 | Larmie ......................... 51/295 |
| 5,498,484 A | | 3/1996 | Duderstadt .................. 428/633 |
| 5,530,050 A | | 6/1996 | Rangaswamy .............. 524/430 |
| 5,554,456 A | | 9/1996 | Ovshinsky et al. ........... 429/59 |
| 5,651,801 A | | 7/1997 | Monroe et al. ............... 51/309 |
| 5,669,941 A | | 9/1997 | Peterson ...................... 51/295 |
| 5,716,422 A | | 2/1998 | Muffoletto et al. ........ 29/623.5 |
| 5,763,106 A | | 6/1998 | Blanchard et al. ........... 428/570 |
| 5,840,440 A | | 11/1998 | Ovshinsky et al. ........... 429/60 |
| 6,025,034 A | | 2/2000 | Strutt et al. .................. 427/450 |
| 6,162,530 A | | 12/2000 | Xiao et al. ............... 428/292.1 |
| 6,210,832 B1 | | 4/2001 | Visco et al. ............. 429/218.1 |
| 6,252,762 B1 | | 6/2001 | Amatucci ................... 361/503 |

OTHER PUBLICATIONS

"Alternatives to Composite Cathodes," ARPA Battery Workshop, Leesburg, VA, Apr. 25, 1995. Christopher J. Crowley and Patrick J. Magari, Creane, Inc. Hanover, New Hampshire.

U.S. patent application Ser. No., Hui et al., filed Feb. 8, 2000.

U.S. patent application Ser. No., Wang et al., filed May 27, 2000.

U.S. patent application Ser. No., Guidotti et al., filed Nov. 2, 1999.

T.D. Xiao, et al. "Nanostructured Feedstock for Thermal Spray Applications" Fine, Ultrafine and Nano Powders. pp. 1–11 Oct. 17–22, 1999.

B.H. Kear, et al. "Nanostructures: The Next Generation of High Performance Bulk Materials and Coatings". Naval Research Reviews. Office of naval Research. Four/1994 vol. XLVII.

T.D. Xiao, et al. "Thermal Spray of Nanostructured Ceramic Coatings for Improved Mechanical Properties". Procs. 12th Intl. Surface Modicication conf., Columbus, OH, Oct. 15, 1998.

R.C. Weast, et al. CRC Handbook of Chemistry and Physics, 66th Eds., 1985–1986 (CRC press, Boca Raton, florida), pp. B104.

T.D. Xiao and P.R. Strutt "Inframat's Nanostructred Materials Technologies: Thermal Spray Feedstocks, Ready–to Press Powders, and Environmental Materials, " Procs. Fine, Ultrafine and Nano Powders 98, New York, NY, Nov. 8–10, 1998.

H.E. Sliney, "A New Chromium Carbide–Based Tribological Coating for Use to 900C with Particular Reference to the Stirling engine," J. vac. Sci. Tech. A, 4 (1986), 2629–2632.

M. Suzuki, "Comparison of Tribological Characterisitics of Sputtered MoS2 Films Coated with Different Apparatus," Wear, 218 (1998), pp. 110–118.

Dowa Mining Co., Ltd., website, //www.dowa.co.jp/.

K.J. Wahl, M. Belin and I.L. Singer, "A Triboscopic Investigation of the Wear and Friction of MoS2 in A Reciprocation Sliding Contact," Wear, 214 (1998), pp. 212–220.

T. Spalvins, "Areview of recent advances insolid film lubrication," J. Vac. Sci. Technol. A., 5 (1987), pp. 212–219.

Zhauang, et al. "Microstructure and tribological properties of sulphide coating produced by ion sulphuration", Wear 225–229 (1999) 799–805.

Ning, et al. "Wear mechanism of ion–sulphurization layer on steel under dry conditions", Wear 247 (2001) 1–8.

* cited by examiner

THERMALLY PROTECTIVE SALT MATERIAL FOR THERMAL SPRAYING OF ELECTRODE MATERIALS

CROSS-REFERENCE TO RELATED APPLICATION

This application claims priority to the provisional application No. 60/185,263 titled Thermal Barrier Coatings for Thermal Spraying of Electrode Materials filed Feb. 28, 2000 which is incorporated herein by reference.

STATEMENT REGARDING FEDERALLY SPONSORED RESEARCH & DEVELOPMENT

The invention was made with Government support under Contract DAAH01-00-C-R061 awarded by the U.S. Army Aviation and Missile Command. The Government has certain rights in the invention.

BACKGROUND OF THE INVENTION

1. Field of the Invention

This invention relates to energy storage and conversion devices. In particular, this invention relates to energy storage and conversion devices using thin film electrodes manufactured by thermal spray.

2. Description of the Related Art

Energy storage devices, such as batteries and super capacitors, and energy conversion devices, such as fuel cells and thermoelectrics, both require electrodes comprising an active material for the energy storage, conversion, and/or release processes. Each year, billions of dollars are spent on both primary and rechargeable batteries for use in applications ranging from small batteries for portable electronics and communications equipment, to larger batteries used for automobiles and uninterruptible power supplies (UPS).

The LiSi/FeS$_2$ couple is the primary power source used for thermally activated batteries ("thermal batteries") for some nuclear weapons and missiles, as described in U.S. Pat. Nos. 4,119,769, 4,840,859, and 4,675,257, which are incorporated by reference herein. These batteries are designed to function only when the electrolyte phase becomes molten. Until the internal pyrotechnic heat source is ignited, the batteries are inert and have an almost unlimited shelf life. Common electrolytes used for these applications include the LiCl—KCl eutectic that melts at 352° C. and the all-lithium LiCl—LiBr—LiF minimum-melting electrolyte that melts at 436° C.

The cathode, separator, and anodes for thermally activated batteries are typically prepared by cold pressing of powders in dies to form pellets. The separator contains enough MgO (typically, 35 weight %) to act as an immobilization agent for the electrolyte once the battery has been activated and the electrolyte melts. The catholyte contains 25% or more of separator material and, in many cases, 1.5% Li$_2$O to act as a lithiation agent to mitigate voltage transients caused by electroactive iron impurities. The anode contains 20–25% electrolyte to aid in cold pressing and to improve the electrochemical performance by increasing the ionic conductivity. Each cell in a bipolar thermal battery stack contains pellets of anode, separator, cathode, and pyrotechnic source (typically, Fe/KClO$_4$ blends). Stainless steel current collectors are located between the anode and the heat pellet, and between the heat pellet and cathode of the adjacent cell. The current collectors also serve as thermal buffers to moderate the heat input to the active cell components. This is important for the FeS$_2$ (pyrite) cathode, in that FeS$_2$ becomes thermally unstable above 550° C., decomposing according to equation 1:

$$2FeS_2 \rightarrow 2FeS + S_2(g) \quad [1]$$

Under these conditions, the fugitive sulfur vapor can react with the LiSi anode to generate enough heat to cause a thermal-runaway condition, where the battery self-destructs.

The need to press catholyte powders such as FeS$_2$ into thin films or pellets for use in thermal batteries increases production costs because of the high labor costs associated with processing of the material (e.g., blending, pelletizing, and quality control checks for weight and thickness). While the current technology of using cold-pressed pellets is suitable for its intended purposes, it has a number of intrinsic limitations. The thinnest pellets that can be fabricated with reasonable yields are in the range from 0.010 to 0.012 inches in thickness. For many applications this results in using a far greater amount of material than is actually needed. A graphite-paper substrate may be used as a reinforcing agent in the cathode pellet, but is not an option with the separator and anode pellets. The use of excess material increases the length and mass of the thermal battery unnecessarily. Pressing of large pellets becomes increasingly more difficult as the diameter of the pellet is increased from 1 inch to 5 inches. The necessary pressure for compaction of pellets increases rapidly as the square of the area of the pellet, so that presses with capacities of 500 tons or more are needed for the larger pellets. Such large presses are very expensive.

Thin films, and thin film electrodes in particular have been fabricated by other techniques, including spray pyrolysis and chemical vapor deposition (CVD). Thin film electrodes have also been prepared by sol-gel methods, electrochemical methods, and molecular beam deposition. An approach to fabrication of electrodes by thermal spray has been reported by R. Henne (Institute far Technische Thermodynamik, Stuttgart, Germany) for at least one energy conversion device, a solid oxide fuel cell, wherein yttria-stabilized zirconia (YSZ) and porosity-graded perovskite are deposited by direct current plasma spray to fabricate multilayer structures. R. Zatorski of Sulzer-Metco has also reported production of battery electrodes by thermal spray techniques. However, the above reports are directed to thermally stable materials which do not decompose at the high temperatures generally required for thermal spray.

Synthesis of thin films of pyrite in particular has previously been investigated. G. Pimenta et al. have produced pyrite using H$_2$S-reactive iron. Pyrite and pyrite films have also been prepared by chemical vapor deposition, sulfurization of iron oxides, electrodeposition of iron films, argon and reactive sputtering, screen printing processes, and physical vapor deposition. Conventional and fine pyrite (micron-sized) is also produced in aqueous solution.

Commonly assigned, copending U.S. patent application Ser. No. 09/432,334 titled Energy Storage and Conversion Devices Using Thermal Sprayed Electrodes and filed on Nov. 2, 1999, discloses the use of sulfur as a thermally protective barrier coating for the active material when making an electrode by thermal spray. The sulfur barrier coating protects the encased active material from the heat of thermal spray thus preventing decomposition. The use of sulfur has some drawbacks however, namely the presence of free sulfur in the electrode. Free sulfur contributes to the initially high voltage seen when the cell starts to discharge, and in some cases free sulfur must be removed, typically by leaching with carbon disulfide, a highly flammable material, thus complicating electrode processing.

SUMMARY OF THE INVENTION

A method for the manufacture of an electrode for an energy storage or conversion device comprises thermally spraying a feedstock mixture comprising an effective quantity of a source of a thermally protective salt and an active material or active material precursor onto a substrate to produce a film of the active material and salt. The film can have a thickness of about 1 to about 1000 microns.

In a particularly advantageous feature, useful active materials include materials which ordinarily decompose or are unavailable at the high temperatures used during thermal spray processes, such as metal chalcogenides. The active materials may be thermally sprayed to form an electrode when the feedstock mixture employs an effective amount of a source of the thermally protective salt coating. The active material feedstock may comprise microstructured or nanostructured materials, which after thermal spray results in electrodes having microstructured or nanostructured active materials, respectively.

BRIEF DESCRIPTION OF THE DRAWINGS

Referring now to the drawings wherein the like elements are numbered alike.

DETAILED DESCRIPTION OF THE PREFERRED EMBODIMENTS

Figure 1:
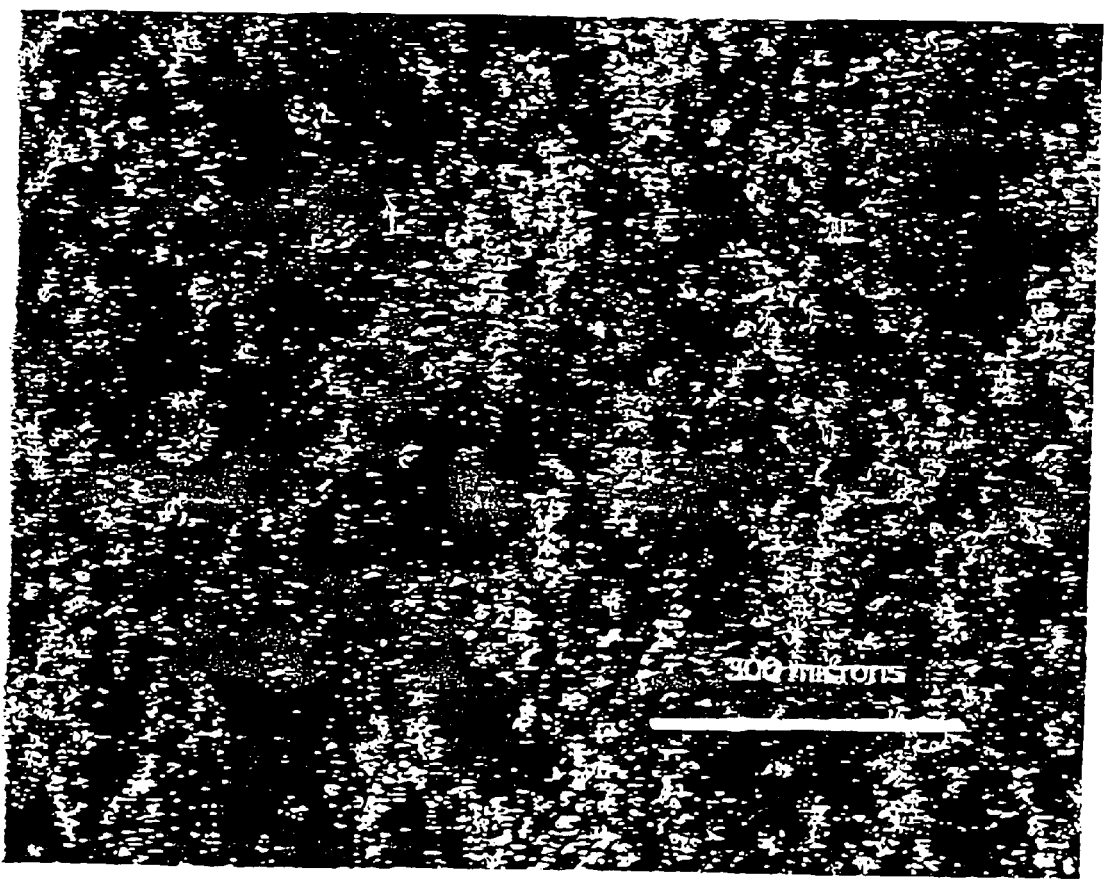
FIG. 1 is a photograph showing the morphology of a pyrite coating deposited using 20% LiCl—KCl eutectic thermally protective salt coating.

A method for the manufacture of an electrode for an energy storage or conversion device comprises thermally spraying a feedstock mixture comprising an effective quantity of a source of a thermally protective salt and an active material or active material precursor onto a substrate to produce a film of the active material and salt. The film can have a thickness of about 1 to about 1000 microns.

Thermal spray methods involve heating feedstock particles to at least a partially molten or plastic state, and propelling the heated particles onto a substrate to form a coating. Methods and apparatus for thermal spray are well known and include both plasma spray (such as direct current (DC) arc and radio frequency (RF) arc) and combustion spray (such as high velocity oxygen flame (HVOF)) methods and apparatus. However, a number of potential active materials for electrodes have not been previously accessible by thermal spray, because they decompose at the temperatures required to transform the feedstock particles to at least a partially molten or plastic state (such as pyrite), or are converted to forms which are unsuitable for use as active materials at these temperatures (such as $MnO_2$ and $Ni(OH)_2$).

Suitable active materials include all or most types of active materials or their precursors employed in electrodes, for example lithium alloys such as Li—Si and Li—Al. In a particularly advantageous feature, useful active materials include thermally sensitive materials like the metal chalcogenides which ordinarily decompose or are unavailable at the high temperatures used during thermal spray processes. Examples of metal chalcogenides include, but are not limited to, $FeS_2$, $CoS_2$, $WS_2$, $Ni(OH)_2$, $MnO_2$, and the like. The active material is protected from decomposition or other undesirable transformation by the presence of a thermally protective salt.

Without being bound by theory, it is believed the thermally protective salt prevents decomposition of the active material by providing cooling via the heat of fusion. The energy associated with the fusion of the thermally protective salt (i.e., heat of fusion) acts to cool the active material particles and thus prevent their thermal dissociation. Thus, in the case of $FeS_2$, the melting of the thermally protective salt coating maintains the sample temperature below 550° C. and prevents thermal decomposition. The thermally protective salt may also act to maintain the localized sulfur vapor pressure in the area immediately surrounding the particle high enough about the active material particle to help repress the decomposition.

The use of the thermally protective salt has a number of advantages over sulfur. The absence of free sulfur eliminates the higher voltage due to free sulfur at the beginning of discharge of a thermal-sprayed disulfide electrodes. Active material in combination with a thermally protective salt does not require leaching with highly flammable carbon disulfide. This greatly simplifies processing of the electrode for battery assembly. The amount of thermally protective salt can be adjusted to control the final porosity of the active material and hence the porosity of the electrode. This allows the electrodes to be fabricated to the desired porosity for different applications. In another advantageous feature, the thermally protective salt can function as an electrolyte and the presence of electrolyte is beneficial from an electrochemical performance standpoint. Cathodes made with the thermally protective salt coating are already wet with electrolyte, which greatly aids in the transfer of lithium ions during the discharge of thermal cells. Normally, electrolyte or electrolyte-binder (separator) material is blended with the active material to achieve this same purpose. Furthermore, $Li_2O$ can be added to the thermally protective salt to lithiate the active material to completely avoid the voltage transient that occurs upon activation. Alternatively, $Li_2O$ addition can also be done as a posttreatment procedure.

The composition of the thermally protective salt can be readily varied for different applications. A preferred thermally protective salt is LiCl—KCl eutectic, which melts at 352° C. and is considered the standard composition for many thermal batteries. However, for long-life thermal batteries, the low-melting LiBr—KBr—LiF electrolyte, which melts at 324.5° C., can be used. Similarly, for high-power applications, the all-lithium LiCl—LiBr—LiF electrolyte, which melts at 436° C., is preferred. It is preferred for the thermally protective salt to be the same as the electrolyte used in the cell although the thermally protective salt and electrolyte may be different materials.

All of the above thermally protective salts contain Li salts, which are hygroscopic. In some conditions, it may be desirable to use salts that are not moisture sensitive. In that case, the use of other electrolyte compositions can be considered. For example, there are a number of carbonate-based and sulfate-based systems that have low enough melting points (below about 500° C.) to be suitable for use with $FeS_2$. One such composition contains 40.26% KCl, 2.01% NaCl, and 57.63% $Li_2SO_4$, which melts at 426° C. There are a number of other compositions that are also suitable. If the presence of the thermally protective salt is incompatible with the electrochemistry of the thermal battery, then the thermally protective salt can be leached from the film of active material to easily eliminate it. Suitable solvents for leaching include all solvents which will dissolve the thermally protective salt with minimal or no dissolution of the active material. Preferably the solvent is water.

Preferably, the active material or its precursor is combined with a source of a thermally protective salt prior to thermal spray. Even more preferably the active material is coated with a thin film of the thermally protective salt prior to thermal spray. The thermally protective salt may be blended with the active material or active material precursor in a ball mill or similar blending or mixing device (such as a V-blender or Turbula blender). The blend is then preferably fused under argon or other inert gas (to prevent oxidation of the active material) at a temperature above the melting point of the thermally protective salt but below the decomposition temperature of the active material. The material may then be lightly ballmilled to round the particle edges and then is fed (preferably under dry, inert gas) into the hopper of the plasma-spray unit and sprayed onto a substrate to form a film. Useful film thicknesses are about 1 to about 1000 microns, preferably about 1 to about 200 microns and more preferably about 5 to about 114 microns. The thermally protective salt acts as a thermal barrier while the active material particles pass through the plasma gun.

The temperature used for the fusion of the thermally protective salt/active material mixtures will vary depending on the melting point of the thermally protective salt. Typically, a temperature of 50° C. to 100° C. above the melting point is satisfactory. The fusion time is also quite variable and can range from 4 hours to over 16 hours, but is readily determined by one of ordinary skill in the art. A shorter time at higher temperatures has the same effect as a longer time at lower temperatures. The key criterion is that the fusion temperature must be below the thermal decomposition temperature of the active material. For example, a blend of pyrite and LiCl—KCl eutectic can safely be fused at 400° C. overnight without causing any degradation of the pyrite.

The amount of thermally protective salt that is effective to provide protection is readily determined by those of ordinary skill in the art, being that amount which provides protection against decomposition of the active material during thermal spray. Generally the amount is in the range of about 10% to about 30% by weight of the total composition (thermally protective salt and active material combined), with about 15% to about 20% by weight of the total material being preferred. The actual thermally protective salt content will vary depending on the heat of fusion (which depends upon the composition) of the electrolyte. A material with a similar melting point but higher heat of fusion than a second material generally means that less of it will be necessary to provide the same level of cooling (heat loss). When present, the amount of $Li_2O$ is typically in the range of about 1% to about 20% by weight of the active material.

Useful substrate materials include 304 stainless steel, graphite paper, aluminum, copper, and conductive polymeric materials. Preferred materials are 304 stainless steel with a thickness in the range of about 0.001 microns to about 0.005 microns and graphite paper. Graphite paper is especially preferred because the resulting material can be easily cut into the desired size and shape. Use of graphite paper as a substrate also greatly simplifies production, in that the substrate can be unrolled from a supply spool, passed in front of a plasma gun and then wound on a take-up reel, which eliminates significant amounts of hand labor.

Adhesion of the electrode using a thermally protective salt is quite good. In one case, a film of pyrite made with LiCl—KCl eutectic salt could be bent over 180 degrees without any spalling of the sample. The good adhesion results in lower interfacial resistance between the deposit and the substrate. The interfacial impedance of a cell made with thermal-sprayed active material and thermally protective salt is as good as that made with an active material sprayed with a sulfur based thermally protective coating. The pseudomonolithic nature of the deposit mitigates the particle-particle contact resistance that is attendant with the use of pressed-powder electrodes.

Figure 2:
FIG. 2 is a photograph of the same materials as shown in FIG. 1 in cross section.

Turning now to the figures, the morphology of a pyrite-thermally protective salt coating thermal-sprayed deposit is shown in FIG. 1 using LiCl-KCl eutectic blended at a level of 20% by weight with the pyrite. Samples of this type were deposited using a dc-arc plasma under an argon cover (250 standard cubic feet per hour (scfph)) with arc currents of between 200 A and 300 A. FIG. 2 is a cross-sectional representation of the same sample. The approximately 150 micron thick deposit is quite dense and uniform in cross-section. X-ray diffraction (XRD) analysis of the deposit showed only lines of pyrite, LiCl and KCl.

Figure 3:
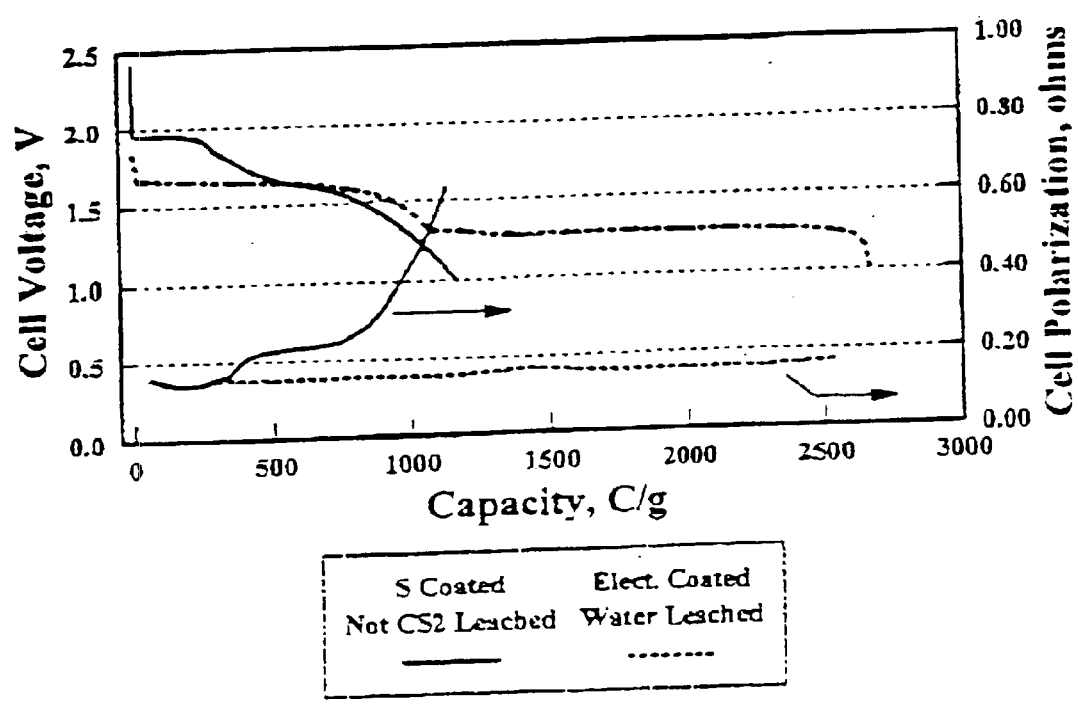
FIG. 3 is a comparison of the performance of LiSi (Flooded)/LiCl—KCL/$FeS_2$ single cells at 400° C. made with sulfur coated or thermally protective salt coated plasma sprayed pyrite.
Figure 4:
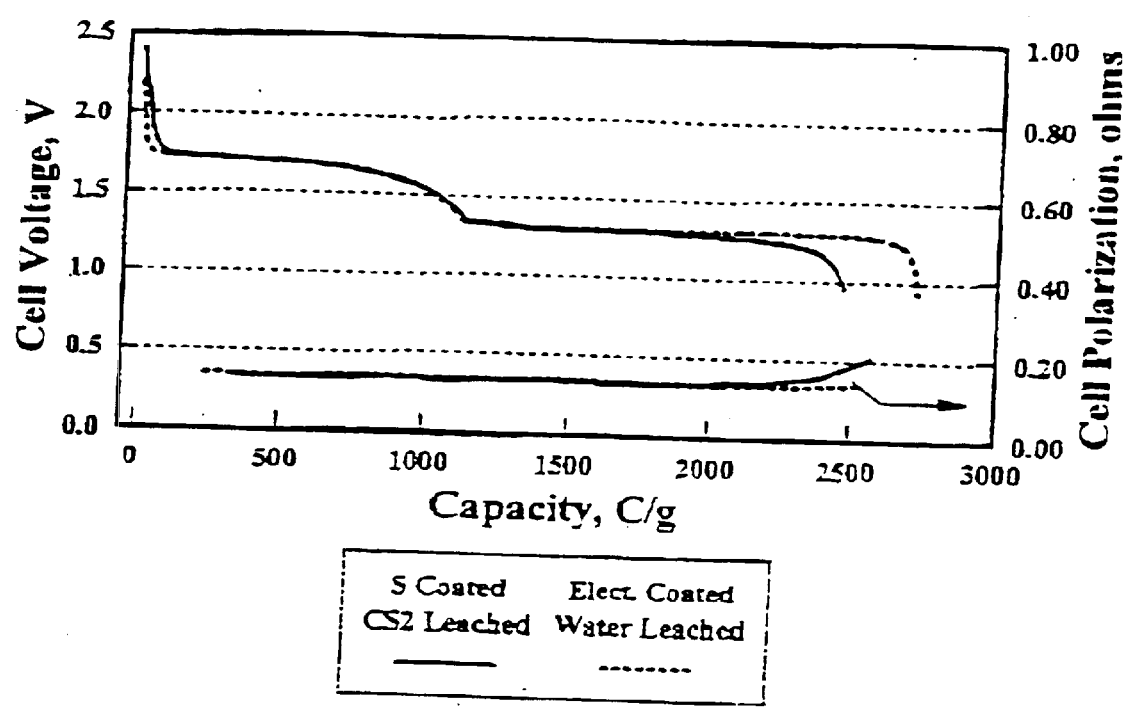
FIG. 4 is a comparison of the performance of LiSi (Flooded)/LiCl—KCL/$FeS_2$ single cells at 450° C. made with sulfur coated or thermally protective salt coated plasma sprayed pyrite.
Figure 5:
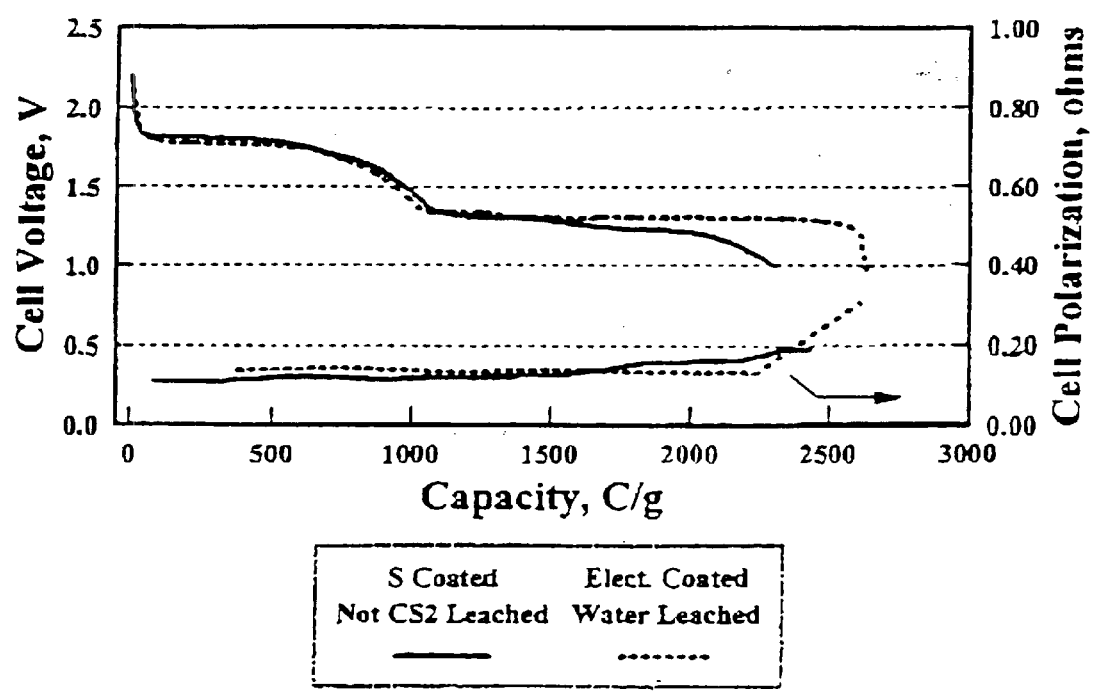
FIG. 5 is a comparison of the performance of LiSi (Flooded)/LiCl—KCL/$FeS_2$ single cells at 500° C. made with sulfur coated or thermally protective salt coated plasma sprayed pyrite.

FIG. 3 shows representative voltage and polarization traces at a discharge temperature of 400° C. for $Li(Si)/FeS_2$ single cells made with flooded Li(Si) anodes (25% electrolyte), LiCl—KCl/35% MgO separator, and pyrite cathodes made with sulfur thermally protective coating or LiCl—KCl thermally protective coating. The thermally protective salt was leached from the deposit with water prior to assembly into the cells, although this was not necessary. Similar voltage traces are shown in FIGS. 4 and 5 for temperatures of 450° C. and 500° C. Voltage and polarization for the two cathode types are similar, except that the initial voltage for the pyrite electrode made with LiCl—KCl thermally protective salt is reduced.

Figure 6:
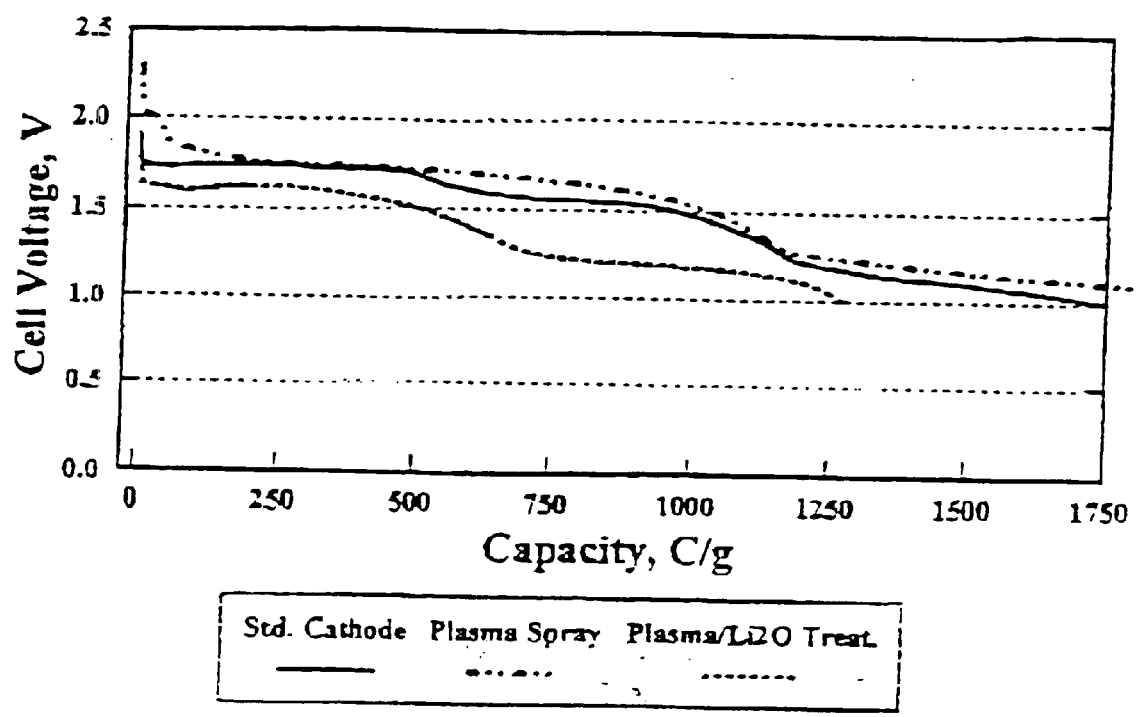
FIG. 6 is a graph showing the voltage response of cells with either a standard pressed powder cathode, a plasma sprayed pyrite and thermally protective salt cathode with $Li_2O$ or a plasma sprayed pyrite and thermally protective salt cathode without $Li_2O$ at 450° C. under 125 $mA/cm^2$ (1A) steady state load and 250 $mA/cm^2$ (2A) pulse load.

The effect of posttreatment of a thermal-sprayed pyrite deposit with $Li_2O$ is shown in FIG. 6 for a pyrite electrode made with thermally protective salt. Data for a standard pressed-powder cell with lithiated catholyte and one in which the $Li_2O$ was not present are shown for comparison. For this test, the electrode was dampened slightly with water and powdered $Li_2O$ was sprinkled onto the electrode surface. The sample was then vacuum dried at 100° C. for several hours to remove the water and the electrode assembled into a cell. The striking feature of this figure is that the elevated voltage at the initiation of discharge is no longer present; the trace looks much like that for the lithiated sample. (The slightly depressed voltage for the $Li_2O$-treated sample is a consequence of excessive $Li_2O$ that increased the cell resistance. The use of a smaller amount of dry $Li_2O$ of a small amount of $Li_2O$ solution would reduce this polarization to an acceptable level.) This same approach may also be used with thermal-sprayed samples prepared with a thermally protective salt which have been treated with water leaching. Incorporation of the $Li_2O$ into the thermally protective salt coating is the preferred approach simplified electrode processing is desireable.

The invention is further illustrated by the following non-limiting Examples.

EXAMPLES

Because the salt coating material used, LiCl—KCl eutectic, is very sensitive to air moisture, some of the operation procedures were proceeded in a glove box. The $FeS_2$ and thermally protective salt (15 weight % or 20 weight % based on the total material) powders were weighed, mixed and sealed in a milling jar in a glove box and subsequently ball milled for 24 hours. After opening the jar in the glove box the powder and the milling medium were separated. The powder was then sealed in a plastic bottle, and later transferred into an environmental furnace for heat treatment. The heat treatment was carried out in an inert argon (Ar) environment at 400° C. for 10 hours. The eutectic LiCl—KCl melts at 352° C., resulting in liquid sintering of the mixture in which the $FeS_2$ pyrite particles are uniformly distributed in the eutectic LiCl—KCl liquid. Upon cooling, this material became blocky. The blocky mixture was then ball milled to form spherical powdery particles, with particle size from about 10 to about 100 microns. After sifting, a highly flowable, coated pyrite was then obtained.

Thermal spray of the coated pyrite was carried out using a Metco 9MB plasma gun fitted with a GH plasma nozzle. 150 micron thick stainless steel substrates were used for all electrodes. The plasma spray parameters were: 100 pounds per square inch (psi) Ar pressure and 160 scfh Ar flow rate, 55 psi $H_2$ pressure, 500 millimeter per second (mm/s) gun speed, and 4 mm index. The ranges of the major spray parameters used are summarized as follows:

| Plasma current: | 180–250 | A |
|---|---|---|
| Plasma voltage: | 40–60 | V |
| Spray distance: | 2.5–4.0 | inch |
| Carrier gas flow: | 40–50 | scfh |
| Powder feed rate: | 2.6–4.0 | lbs/h |
| Spray passes: | 4–40 | |

Depending on the number of spray passes, various thicknesses of electrodes were fabricated. The thickness and weight of the deposited active material and thermally protective salt coating are illustrated in the Table 1.

TABLE 1

| Sample # | Average Thickness (microns) | Weight (mg) | Density (g/cm³) |
|---|---|---|---|
| 50-1 | 154 | 207 | 1.68 |
| 50-2 | 155 | 184 | 1.49 |
| 50-3 | 164 | 197 | 1.50 |
| 50-4 | 155 | 215 | 1.73 |
| 50-5 | 142 | 122 | 1.08 |
| 50-6 | 129 | 130 | 1.26 |

The processed electrodes showed three types of crystalline peaks by XRD analysis, including $FeS_2$ pyrite peaks, LiCl peaks, and KCl peaks. No other extraneous subsulfide peaks detected in the spectra. It thus appears that the LiCl—KCl eutectic neither evaporated nor burned off, but prevented pyrite decomposition by acting as a barrier for oxygen diffusion into the $FeS_2$ particles and further heating of the $FeS_2$ particles by plasma flame. The molten LiCl—KCl eutectic also promoted strong bonding between the substrate and the $FeS_2$ active material.

Based on these results it can be concluded that use of a thermally protective salt allows the production of pure pyrite phase without decomposition of the active material and allows in-situ deposition of active cathode material with an electrolyte.

The electrodes were fabricated into 1.25 inch diameter single cells with 44 weight percent Li/56 weight percent Si anodes containing 25% LiCl—KCl eutectic and separators based on 35% MgO and LiCl—KCl eutectic. The mass of active $FeS_2$ in each sample was determined to allow gravimetric efficiencies to be calculated. Cells were discharged galvanostatically between heated platens at temperatures between 400° C. and 550° C. under computer control in a glovebox under an atmosphere of high-purity argon. A steady-state current of 1 A (approximately 125 mA/cm²) was used with a 1-second, 2 A (approximately 250 mA/cm²) pulse applied every minute. This allowed the overall cell resistance to be calculated. The cells were discharged to a cutoff voltage of 1.0 V. Voltage traces are shown in FIGS. 3, 4, and 5.

As can be clearly seen, the inclusion of a thermally protective salt during thermal spray of active materials to form electrodes is highly advantageous. The thermally protective salt allows the use of active materials which would normally decompose under thermal spray conditions. The thermally protective salt also improves adhesion to the substrate and improves electrochemical performance.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for the manufacture of an electrode for an energy storage and conversion device, comprising thermally spraying a feedstock mixture comprising an effective quantity of a source of a thermally protective salt and an active material or active material precursor onto a substrate to produce a film of the active material and salt wherein the film has a thickness of about 1 to about 1000 microns wherein the source of the thermally protective salt is a LiCl—KCl eutectic, LiBr—KBr—LiF, LiCl—LiBr—LiF, a carbonate-based system with a melting point below about 500° C., or a sulfate-based system with a melting point below about 500° C.

2. The method of claim 1, wherein the source of the thermally protective salt is LiCl—KCl eutectic.

3. The method of claim 1, wherein the active material film comprises a metal chalcenogide.

4. The method of claim 3, wherein the active material film comprises a metal sulfide.

5. The method of claim 3, wherein the active material film comprises $FeS_2$.

6. The method of claim 3, wherein the active material film comprises $FeS_2$, $CoS_2$, $WS_2$, $Ni(OH)_2$, or $MnO_2$.

7. The method of claim 1, wherein thermal spraying is by DC arc plasma spray.

8. The method of claim 1, wherein the films thickness is about 1 to about 200 microns.

9. The method of claim 1, wherein the film thickness is about 5 to about 114 microns.

10. The method of claim 1, wherein the active material film is nanostructured.

11. The method of claim 1 further comprising removing the thermally protective salt from the film by leaching with a solvent.

12. The method of claim 1 wherein the feedstock mixture further comprises $Li_2O$.

13. The method of claim 1 further comprising adding $Li_2O$ to the film of active material after thermally spraying the feedstock mixture.

14. A method for the manufacture of an electrode for an energy storage and conversion device, comprising
ball-milling an active material comprising a metal chalcenogide or metal chalcenogide precursor with about 10% to about 30% by weight based on the total weight of the composition of a source of a thermally protective salt, to provide a feedstock for thermal spray; and
thermally spraying the feedstock for thermal spray onto a substrate, to produce an active material film wherein the source of the thermally protective salt is a LiCl—KCl eutectic, LiBr—KBr—LiF, LiCl—LiBr—LiF, a carbonate-based system with a melting point below about 500° C., or a sulfate-based system with a melting point below about 500° C.

15. The method of claim 14, wherein the source of the thermally protective salt is LiCl—KCl eutectic.

16. The method of claim 14, wherein the thermally protective salt coats particles of the active material prior thermally spray.

17. The method of claim 16, wherein the active material film comprises a metal sulfide.

18. The method of claim 16, wherein the active material film comprises $FeS_2$.

19. The method of claim 16, wherein the active material film comprises $FeS_2$, $CoS_2$, $WS_2$, $Ni(OH)_2$, or $MnO_2$.

20. The method of claim 14, wherein thermal spraying is by DC arc plasma spray.

21. The method of claim 14, wherein the film has a thickness of about 1 to about 200 microns.

22. The method of claim 14, wherein the film has a thickness of about 5 to about 114 microns.

23. The method of claim 14, wherein the active material film is nanostructured.

24. The method of claim 14, further comprising removing the thermally protective salt from the film by leaching with a solvent.

25. The method of claim 14 wherein the feedstock further comprises $Li_2O$.

26. A electrode for an energy storage and conversion device, comprising
a substrate; and
a layer of active material comprising a thermally protective salt deposited on the substrate, the layer having a thickness of about 1 to about 200 microns wherein the active material is unsuitable without the thermally protective salt for use in an electrode at thermal spray temperatures further wherein the thermally protective salt is derived from a source of a thermally protective salt which a LiCl—KCl eutectic, LiBr—KBr—LiF, LiCl—LiBr—LiF, a carbonate-based system with a melting point below about 500° C., or a sulfate-based system with a melting point below about 500° C.

27. The electrode of claim 26, wherein the layer of active material has a thickness of about 5 to about 114 microns.

28. The electrode of claim 26, wherein the layer of active material has a thickness of about 5 to about 114 microns.

29. The electrode of claim 26, wherein the layer of active material comprises $FeS_2$, $CoS_2$, $WS_2$, $Ni(OH)_2$, or $MnO_2$.

30. The electrode of claim 29, wherein the layer of active material comprises $FeS_2$.

31. A method for the manufacture of an electrode, comprising
providing a feedstock comprising pyrite and an effective quantity of a source of a thermally protective salt; and
thermally spraying the feedstock onto a substrate, to produce a film of salt coated pyrite active material having a thickness of about 1 to about 1000 microns wherein the source of the thermally protective salt is a LiCl—KCl eutectic, LiBr—KBr—LiF, LiCl—LiBr—LiF, a carbonate-based system with a melting point below about 500° C., or a sulfate-based system with a melting point below about 500° C.

32. The method of claim 31, wherein thermal spraying is by DC arc plasma spray.

33. The method of claim 31, wherein the film has a thickness of about 1 to about 200 microns.

34. The method claim 31, wherein the film has a thickness of about 5 to about 114 microns.

35. A method for the manufacture of a cathode, comprising
ball-milling pyrite with about 10% to about 30% by weight based on the total weight of the composition of a source of a thermally protective salt to provide a feedstock comprising a source of a thermally protective salt coating and pyrite; and
thermally spraying the feedstock solution onto a substrate to produce a film of salt coated pyrite active material having a thickness of about 1 to about 200 microns wherein the source of the thermally protective salt is a LiCl—KCl eutectic, LiBr—KBr—LiF, LiCl—LiBr—LiF, a carbonate-based system with a melting point below about 500° C., or a sulfate-based system with a melting point below about 500° C.

36. The method of claim 35, wherein thermal spraying is by DC arc plasma spray.

37. The method of claim 35, wherein the films have a thickness of about 5 to about 114 microns.

* * * * *